(12) United States Patent
Boren et al.

(10) Patent No.: US 9,067,675 B2
(45) Date of Patent: Jun. 30, 2015

(54) AIRPLANE EMERGENCY SUPPLEMENTAL BRAKING SYSTEM AND METHOD

(71) Applicant: The Boeing Company, Chicago, IL (US)

(72) Inventors: Kelly L. Boren, Marysville, WA (US); Sergey D. Barmichev, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 560 days.

(21) Appl. No.: 13/736,632

(22) Filed: Jan. 8, 2013

(65) Prior Publication Data
US 2014/0191078 A1 Jul. 10, 2014

(51) Int. Cl.
*B64C 25/42* (2006.01)
*B60T 1/14* (2006.01)
*B64C 25/32* (2006.01)
*B64C 25/68* (2006.01)

(52) U.S. Cl.
CPC . *B64C 25/42* (2013.01); *B60T 1/14* (2013.01); *B64C 25/32* (2013.01); *B64C 25/68* (2013.01)

(58) Field of Classification Search
CPC ......... B64F 1/02; B64C 25/426; B64C 25/42; B64C 25/68
USPC ............ 244/110 R, 111, 110 A, 110 F, 110 H
See application file for complete search history.

(56) References Cited

U.S. PATENT DOCUMENTS

| | | | |
|---|---|---|---|
| 1,502,653 A | | 7/1924 | Bassler |
| 1,613,843 A | * | 1/1927 | Mummert et al. ............. 244/109 |
| 1,893,591 A | * | 1/1933 | Minshall ................... 244/110 R |
| 2,355,210 A | * | 8/1944 | Eddy ............................. 244/109 |
| 2,454,257 A | * | 11/1948 | Rowe ......................... 244/110 R |
| 3,118,640 A | | 1/1964 | Lay et al. |
| 3,493,082 A | * | 2/1970 | Bell .............................. 188/377 |
| 3,524,517 A | * | 8/1970 | La Fleur ....................... 180/124 |

(Continued)

FOREIGN PATENT DOCUMENTS

| | | | | |
|---|---|---|---|---|
| DE | 1099858 B | * | 2/1916 | .............. B64C 25/42 |
| DE | 959972 C | * | 3/1957 | ................ B60T 1/14 |

(Continued)

OTHER PUBLICATIONS

U.S. Appl. No. 13/556,211, filed Jul. 24, 2012.

*Primary Examiner* — Benjamin P Lee
(74) *Attorney, Agent, or Firm* — Smith Moore Leatherwood LLP; Thomas W. Epting

(57) ABSTRACT

A system, an apparatus, and a method for an aerospace vehicle braking system for decelerating an aerospace vehicle on a landing surface. An arm is provided having a first portion connected to the aerospace vehicle and a second portion generally distal to the first portion. The second portion of the arm includes an engagement portion configured to engage the landing surface. The arm is movable between a first position, wherein the engagement portion is substantially disengaged from the landing surface, and a second position, wherein the engagement portion engages the landing surface with a force sufficient to significantly decelerate the aerospace vehicle. The engagement portion is configured to pivot with respect to the arm in response to the direction of travel of the aerospace vehicle upon the landing surface. An actuator is connected to the arm to selectively move the arm between the first position and the second position.

27 Claims, 5 Drawing Sheets

(56) References Cited

U.S. PATENT DOCUMENTS

| | | | |
|---|---|---|---|
| 3,582,024 A | | 6/1971 | Rhodes et al. |
| 3,595,336 A | * | 7/1971 | Perez .......................... 180/128 |
| 4,019,698 A | * | 4/1977 | Earl ........................... 244/110 A |
| 4,815,678 A | * | 3/1989 | Gawne .......................... 244/109 |
| 4,923,145 A | * | 5/1990 | Broadhurst ................ 244/100 A |
| 5,927,646 A | * | 7/1999 | Sandy et al. .................. 244/108 |
| 5,984,229 A | * | 11/1999 | Hollowell et al. ........... 244/12.4 |
| 6,845,944 B2 | * | 1/2005 | Bays-Muchmore et al. . 244/109 |
| 8,851,419 B2 | * | 10/2014 | Cottet ........................... 244/109 |
| 2004/0200930 A1 | * | 10/2004 | Bays-Muchmore et al. . 244/109 |
| 2008/0308673 A1 | | 12/2008 | Liu |
| 2014/0027571 A1 | * | 1/2014 | Barmichev et al. ....... 244/103 R |

FOREIGN PATENT DOCUMENTS

| | | | | |
|---|---|---|---|---|
| FR | 972571 A | * | 1/1951 | ................ B64F 1/02 |
| FR | 1043987 A | * | 11/1953 | ................ B64F 1/02 |
| GB | 1337671 A | * | 11/1973 | ................ B64F 1/02 |
| RU | 2097282 C1 | * | 11/1997 | ................ B64F 1/02 |

\* cited by examiner

_US 9,067,675 B2_

AIRPLANE EMERGENCY SUPPLEMENTAL BRAKING SYSTEM AND METHOD

TECHNOLOGICAL FIELD

The present disclosure relates generally to a system and method for an emergency landing braking of an aerospace vehicle, and in particular, to an auxiliary or supplemental braking system for use in connection with a primary braking system in low traction landing conditions.

BACKGROUND

On occasion, an airplane, or some other aerospace vehicle, i.e., a vehicle capable of flight both within and outside the sensible atmosphere, may experience emergency landing situations, such as low traction conditions when a primary braking system on the airplane's main landing gear may be ineffective and/or in situations where the airplane's overrunning the end of the runway is unavoidable. These conditions may occur when landing long on the runway or landing strip with insufficient run out to accommodate normal braking procedures, or less than optimal brake capacity is realized. In these instances, the crew and aircraft may face a catastrophic situation without additional braking capacity.

Additional braking capacity may be provided, if the aircraft is so-equipped, by the use of thrust reversers. However, thrust reversers may have drawbacks in that they may be relatively expensive to provide on an aircraft and may also add an undesirable amount of weight to the aircraft. Additionally, thrust reversers can be relatively expensive and labor-intensive to maintain in operation.

Alternatives to thrust reversers exist to provide additional braking to an aircraft. For example, antiskid brake control systems and parachutes may be used for braking.

While antiskid braking and parachute systems may serve as effective solutions, they can be limited at times to within a relatively tight range of operational conditions. Additionally, anti-skid systems can become problematic in low friction landing situations.

BRIEF SUMMARY

Accordingly, it would be desirable to have a system, apparatus, and method that take into account at least some of the issues discussed above, as well as other potential issues.

Example embodiments of the present disclosure are generally directed to a system, an apparatus, and a method for an aerospace vehicle braking system for decelerating an aerospace vehicle on a landing surface, including an arm having a first portion connected to the aerospace vehicle and a second portion generally distal to the first portion. The second portion of the arm includes an engagement portion configured to engage the landing surface. The arm is movable between a first position, where the engagement portion is substantially disengaged from the landing surface, and a second position, where the engagement portion engages the landing surface with a force sufficient to significantly decelerate the aerospace vehicle. An actuator is connected to the arm to selectively move the arm between the first position and the second position.

In another example embodiment, landing gear is connected to the aerospace vehicle, and the arm is connected to the landing gear for pivoting or other type of movement, such as rectilinear, translatory, rotational, and/or curvilinear movement, with respect thereto between the first position and the second position.

In another example embodiment, the engagement portion is configured to physically damage the landing surface upon the arm being in the second position.

In another example embodiment, a braking device is connected to the second portion of the arm and is configured to pivot with respect to the arm in response to the direction of travel of the aerospace vehicle upon the landing surface. At least one engagement member, such as a spike, extends downwardly from the second component that engages the landing surface upon the arm being in the second position.

In still another example embodiment, a braking device is connected to the second portion of the arm and configured to pivot with respect to the arm in response to the direction of travel of the aerospace vehicle upon the landing surface, and another example embodiment provides that the braking device has an upturned leading surface with respect to the direction of travel of the aerospace vehicle upon the landing surface.

Yet another example embodiment provides a first component connected to the second portion of the arm and configured to pivot about a first axis with respect to the arm. A second component is connected to the first component and is configured to pivot with respect to the first component about a second axis generally perpendicular to the first axis in response to the direction of travel of the aerospace vehicle upon the landing surface, and at least one engagement member, such as a spike, extends downwardly from the second component and engages the landing surface upon the arm being in the engaged position.

Another example embodiment includes at least one debris deflector component connected to the arm that generally deflects away from the landing gear debris which may arise upon the engagement portion engaging the landing surface with a force sufficient to significantly decelerate the aerospace vehicle.

Still another example embodiment includes tires connected to the landing gear and at least one debris deflector component connected to the arm that generally deflects away from the tires.

Yet another example embodiment includes the engagement portion of the arm having at least one downwardly extending claw-shaped portion that engages the landing surface upon the arm being in the second position, and one example embodiment includes at least three spaced-apart downwardly extending claw-shaped portions that each engages the landing surface upon the arm being in the second position.

Another example embodiment provides at least one sensor that monitors the force exerted by the engagement portion against the landing surface, and at least one controller may be connected to the sensor and to the actuator that allows for the force exerted by the engagement portion against the landing surface to be selectively controlled. A further example embodiment includes at least one controller connected to the sensor and to the actuator that automatically applies in a predetermined manner the force to be exerted by the engagement portion against the landing surface.

An example embodiment may also include a landing gear system for an aerospace vehicle, the landing gear system comprising a force bearing portion connected to the aerospace vehicle that at least partially supports the aerospace vehicle. An arm is provided having a first portion connected to the force bearing portion and a second portion generally distal to the first portion. The second portion of the arm includes an engagement portion configured to forcefully engage the landing surface, and the arm is movable between a first position, wherein the engagement portion is substantially disengaged from the landing surface, and a second position, wherein the engagement portion engages the landing surface with a force sufficient to significantly decelerate the aerospace vehicle. An actuator is connected to the arm to selectively move the arm between the first position and the second position.

Another example embodiment of the landing gear system includes a braking device connected to the second portion of the arm and configured to pivot with respect to the arm in response to the direction of travel of the aerospace vehicle upon the landing surface and at least one engagement member, such as one or more spikes, extending downwardly from the second component that engages the landing surface upon the arm being in the position. A further example may include a braking device connected to the second portion of the arm and configured to pivot with respect to the arm in response to the direction of travel of the aerospace vehicle upon the landing surface. Additionally, at least one debris deflector device may be provided that generally deflects away from the landing gear debris which may arise upon the engagement portion engaging the landing surface with a force sufficient to significantly decelerate the aerospace vehicle.

Another example embodiment includes an aerospace vehicle that lands on a landing surface, that has a fuselage, an airfoil connected to the fuselage, at least one power source connected to at least one of the fuselage and the airfoil, and a landing gear configuration connected to the fuselage that provides support of the aerospace vehicle on the landing surface. An arm is provided having a first portion connected to the landing gear and a second portion generally distal to the first portion, and the second portion of the arm includes an engagement portion configured to forcefully engage the landing surface. The arm is movable between a first position substantially disengaged from the landing surface and a second position wherein the engagement portion engages the landing surface with a force sufficient to significantly decelerate the aerospace vehicle. An actuator selectively moves the arm between the first position and the second position.

In other aspects of example embodiments, a method is provided for decelerating an aerospace vehicle on a landing surface, and includes: possessing an arm having a first portion connected to the aerospace vehicle and a second portion generally distal to the first portion, the second portion of the arm including an engagement portion configured to engage the landing surface; moving the arm being between a first position wherein the engagement portion is substantially disengaged from the landing surface to a second position wherein the engagement portion engages the landing surface; and applying a force against the landing surface with the engagement portion sufficient to significantly decelerate the aerospace vehicle.

An example method may also include that the applying of the force against the landing surface with the engagement portion sufficient to significantly decelerate the aerospace vehicle aerospace vehicle is accomplished using a powered actuator and/or includes monitoring the force exerted by the engagement portion against the landing surface using at least one monitor and/or using the monitor to selectively and/or automatically control the force exerted by the engagement portion against the landing surface.

In other aspects of example embodiments, an airplane emergency supplemental braking system and method are provided.

The features, functions and advantages discussed herein may be achieved independently in various example embodiments or may be combined in yet other example embodiments, the further details of which may be seen with reference to the following description and drawings.

BRIEF DESCRIPTION OF THE DRAWINGS

Figure 1:
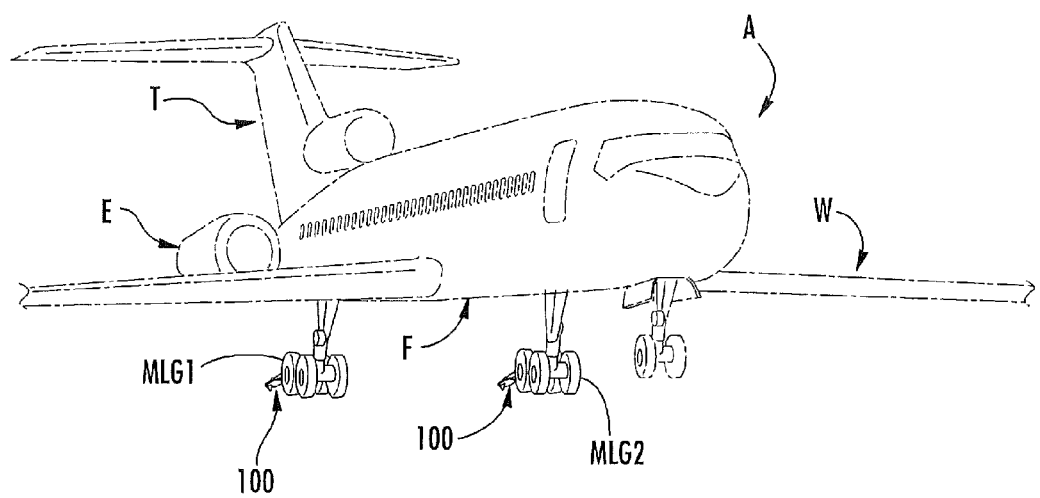
Figure 2:
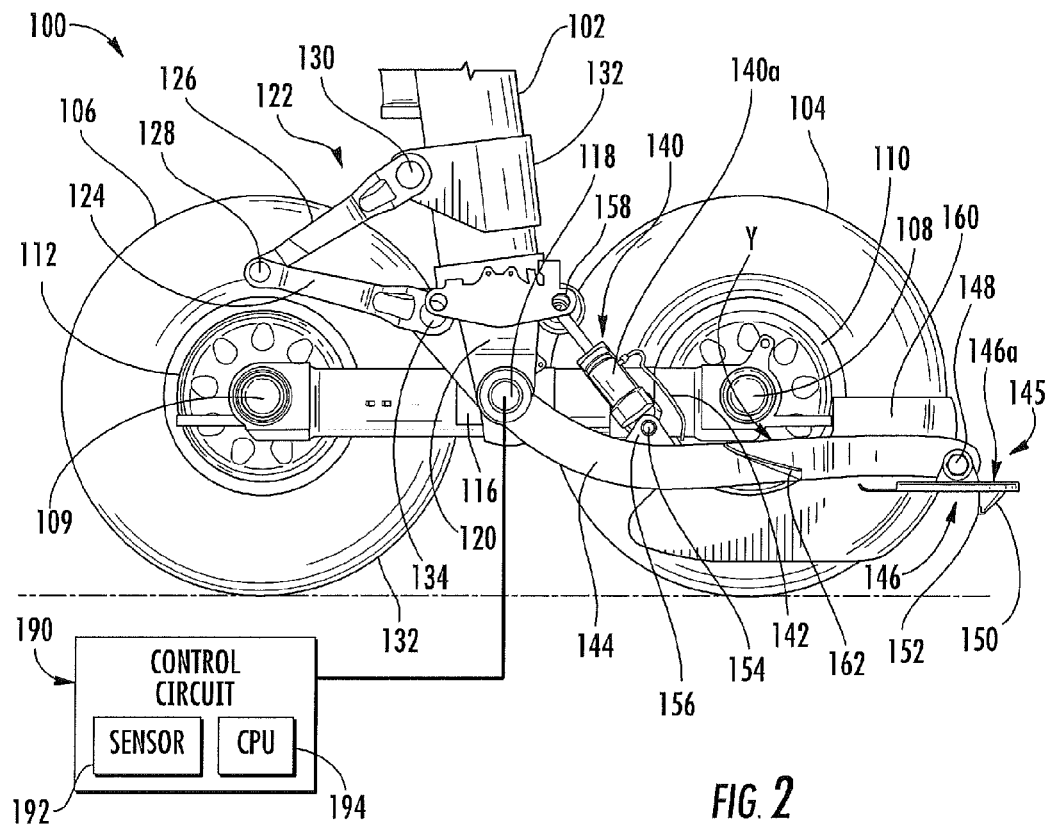
Figure 3:
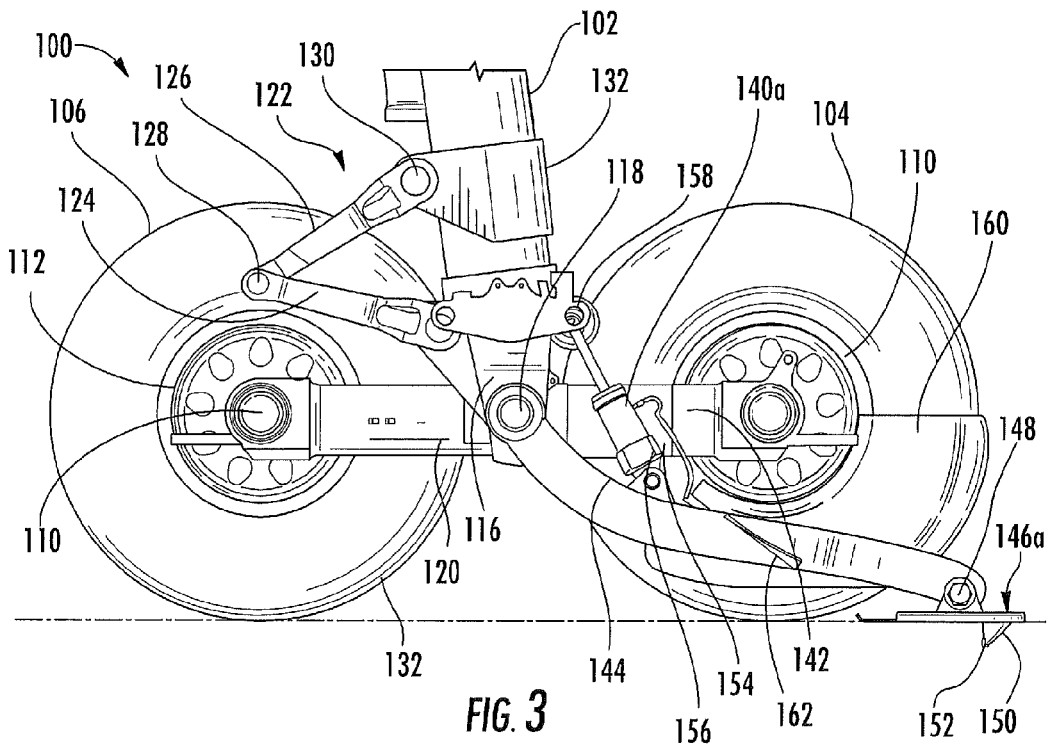
Figure 4:
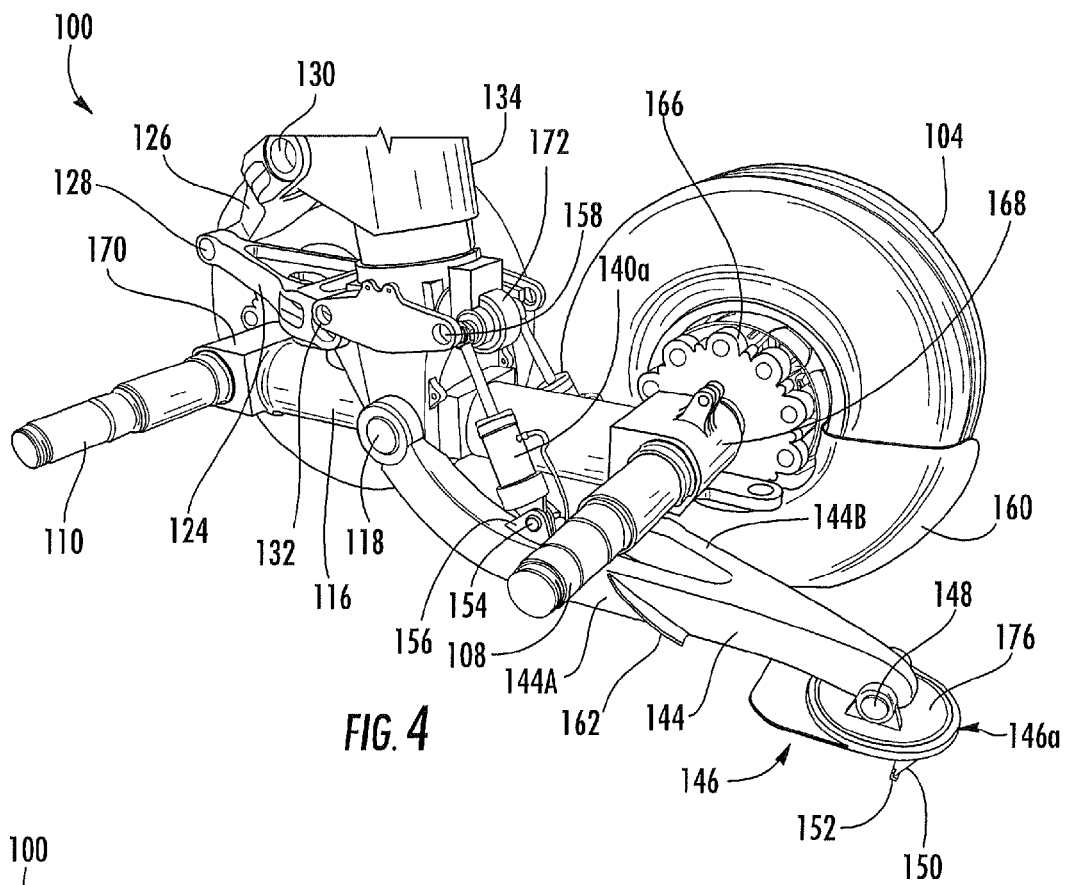
Figure 5:
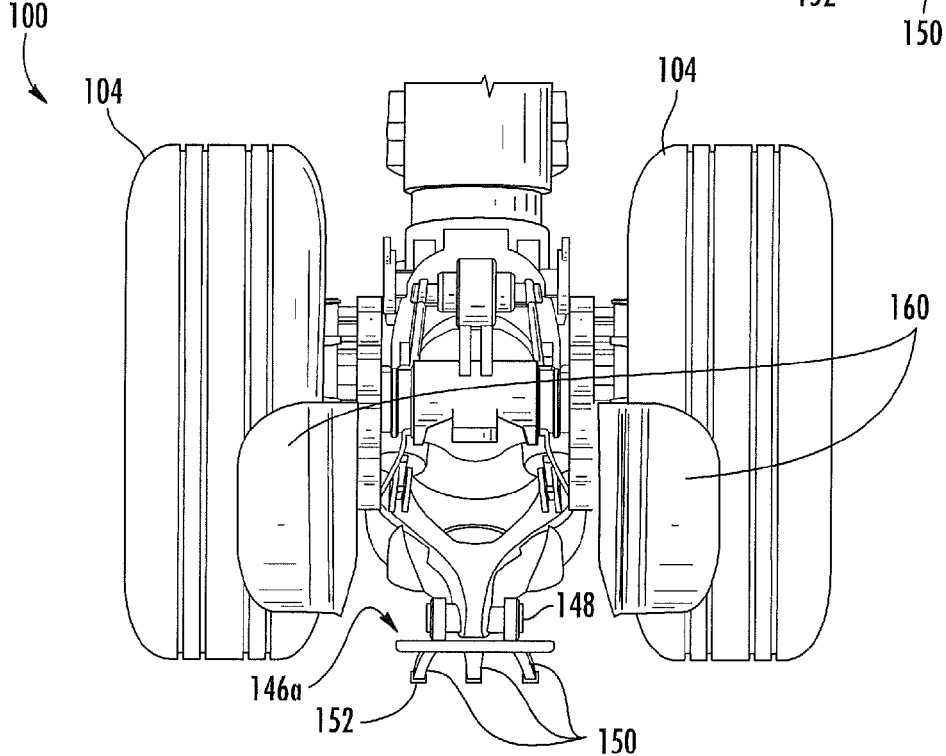
Figure 6:
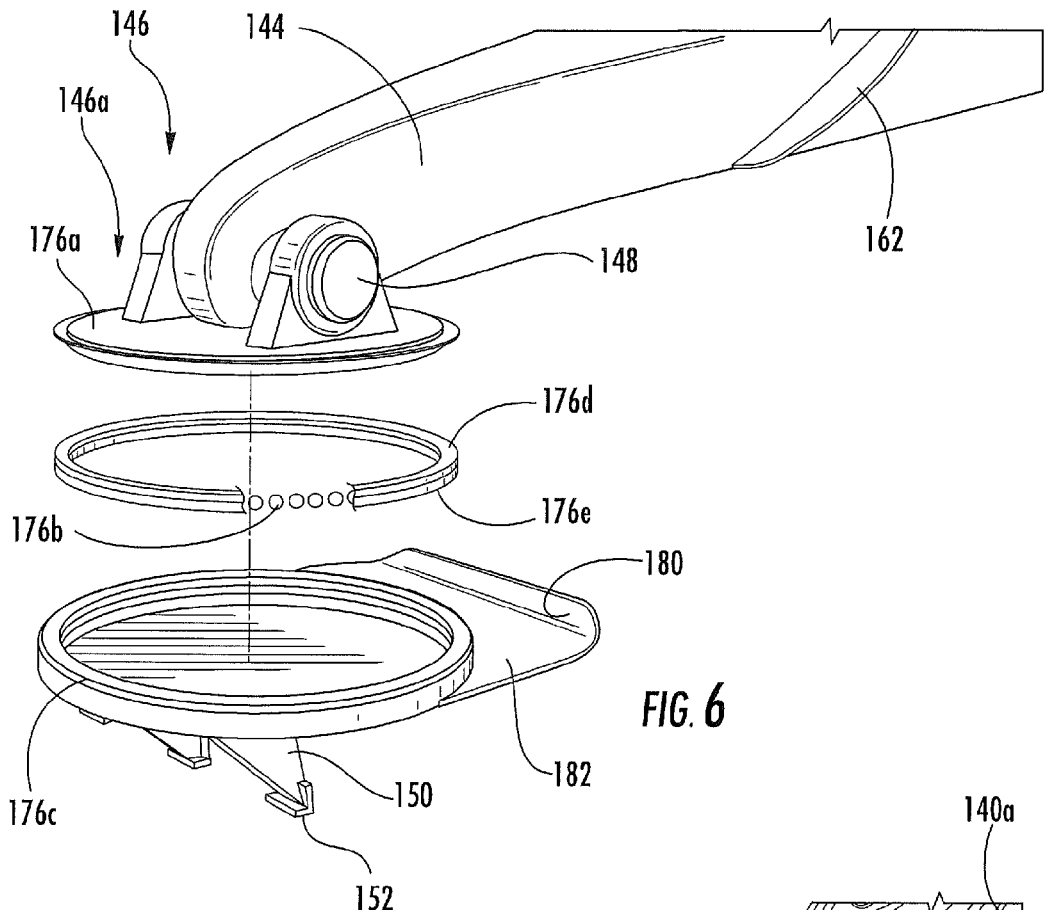
Figure 7:
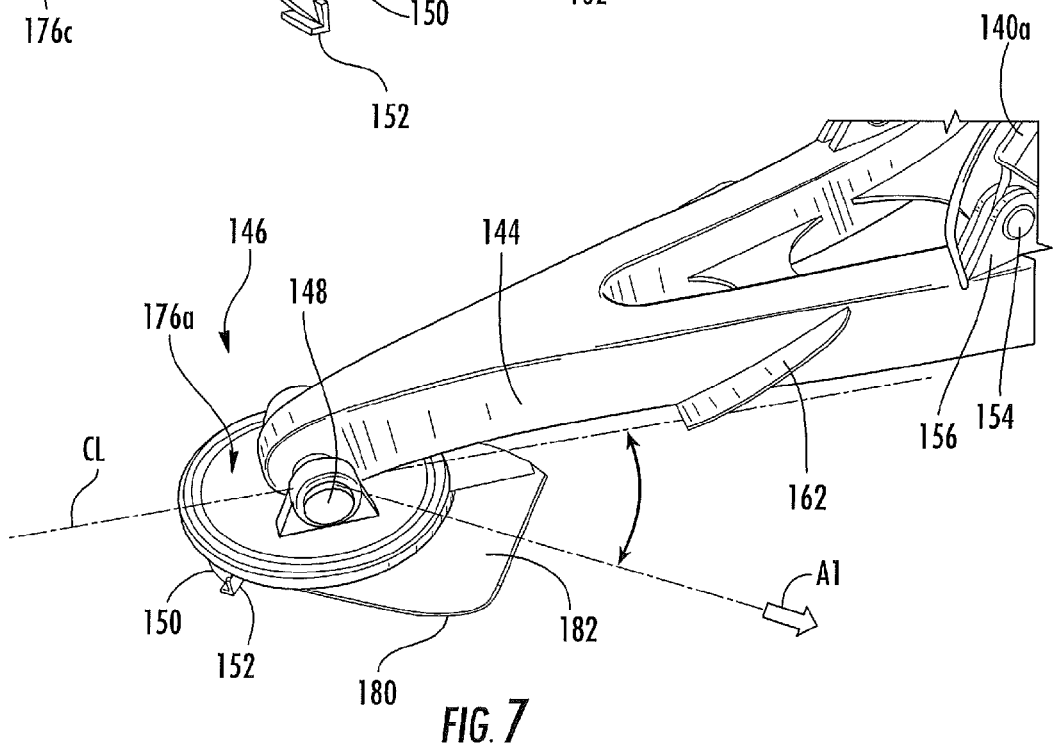
Figure 8:
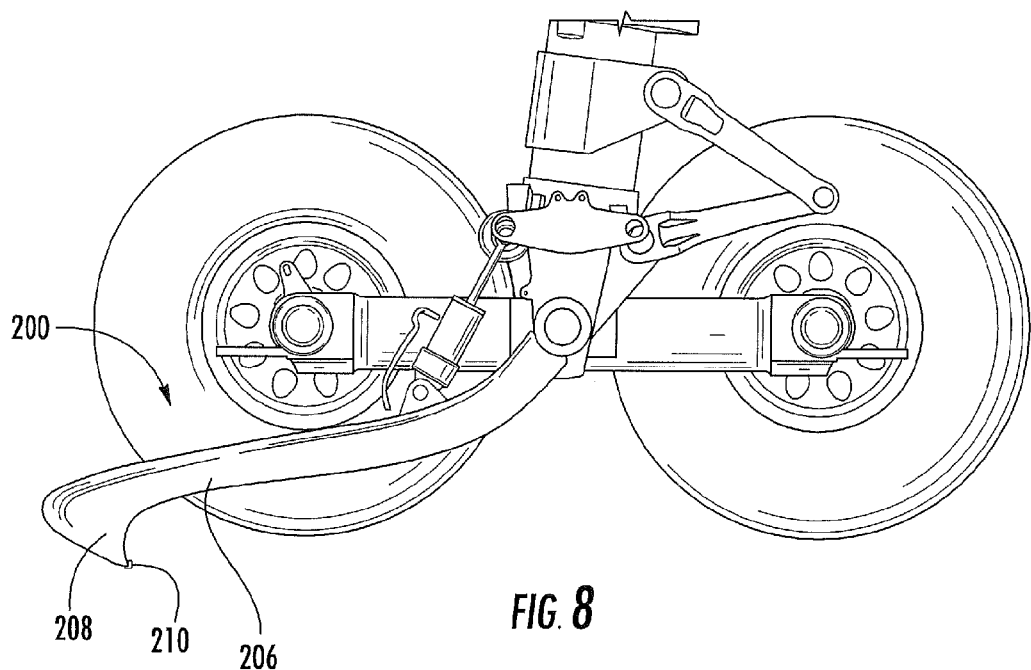
Figure 9:
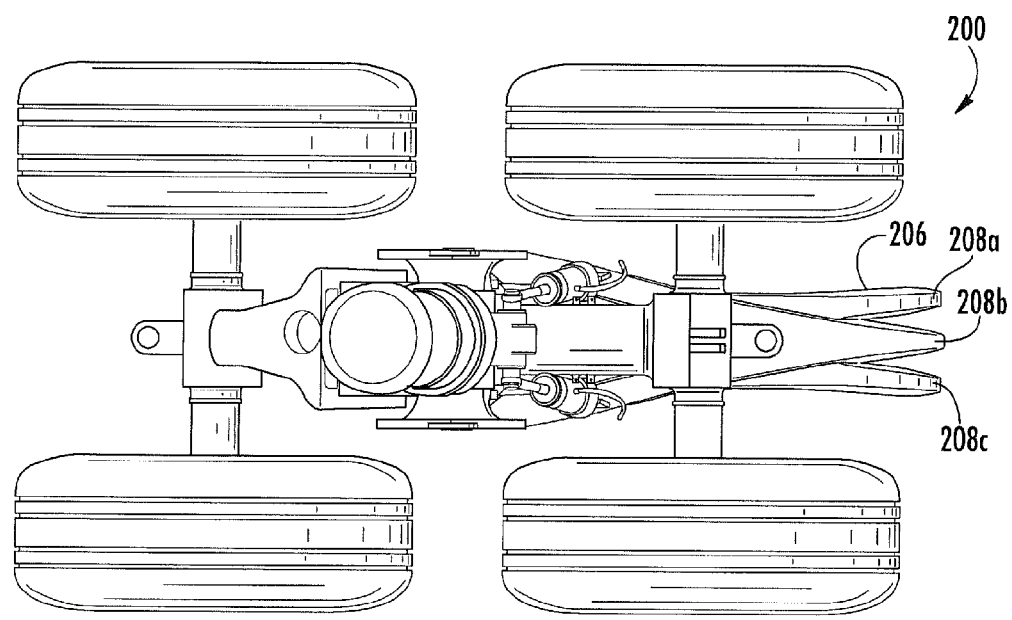

Having thus described example embodiments of the disclosure in general terms, reference will now be made to the accompanying drawings, which are not necessarily drawn to scale, and wherein:

FIG. 1 illustrates an airplane having an airplane emergency supplemental braking system according to one example embodiment;

FIG. 2 illustrates an airplane emergency supplemental braking system according to one example embodiment, with the airplane emergency supplemental braking system retracted;

FIG. 3 illustrates the airplane emergency supplemental braking system shown in FIG. 2 in a deployed configuration;

FIG. 4 illustrates a portion of the airplane emergency supplemental braking system shown in FIG. 2;

FIG. 5 illustrates from the rear a portion of the airplane emergency supplemental braking system shown in FIG. 2;

FIG. 6 illustrates an engagement portion of the airplane emergency supplemental braking system shown in FIG. 2;

FIG. 7 illustrates an engagement portion of the airplane emergency supplemental braking system shown in FIG. 2;

FIG. 8 illustrates an airplane emergency supplemental braking system according to another example embodiment; and FIG. 9 illustrates the airplane emergency supplemental braking system shown in FIG. 8.

DETAILED DESCRIPTION

Some embodiments of the present disclosure will now be described more fully hereinafter with reference to the accompanying drawings, in which some, but not all embodiments of the disclosure are shown. Indeed, various embodiments of the disclosure may be embodied in many different forms and should not be construed as limited to the embodiments set forth herein; rather, these example embodiments are provided so that this disclosure will be thorough and complete, and will fully convey the scope of the disclosure to those skilled in the art. Like reference numerals refer to like elements throughout.

FIG. 1 illustrates an airplane emergency supplemental braking system, or "system," generally 100, installed on an aerospace vehicle, such as an airplane, generally A. Each of the main landing gear configurations, generally MLG1 and MLG2, of airplane A are illustrated as having an application of a system 100, and both depicted as being in a deployed, or engaged, configuration, as also shown in FIG. 3. Airplane A has a fuselage, generally F, airfoils, such as wings, generally W, connected to fuselage F, and at least one power source, such as engines, generally E, connected fuselage F and/or wings W or tail section, generally T.

In FIG. 2, system 100 is shown in a disengaged configuration and is connected to a landing gear configuration, such as MLG1 and/or MLG2, which includes a shock/strut assembly, generally 102, to which tires 104, 106 are each carried for rotation on a respective axle 108, 109. Tires 104, 106 are carried on wheels 110, 112, respectively, and wheels 110, 112 are supported on a wheel truck beam, generally 116. Airplane landing gear MLG1 and/or MLG2 could also include force bearing portions other than wheels and tires, and could include skis, tracks, rollers, etc. (none shown).

Wheel truck beam 116 is connected to shock/strut assembly 102 via a pivot 118 which passes through a structural member, generally 120. A torque link arrangement, generally 122, is provided having a lower torque link 124 and an upper torque link 126. Torque links 124, 126 are interconnected by a pivot 128 and are connected via a pivot 130 to a mounting bracket, generally 132, which may be integral to the shock/strut assembly 102. A lower pivot 134 connects lower link 124 to shock/strut assembly 102.

An arm, or yoke, generally Y, is pivotally attached to shock/strut assembly 102 via pivot 118 for movement between a disengaged position, as shown in FIG. 2, to a deployed, or engaged, position as shown in FIG. 3. Actuators, generally 140, such as a hydraulic cylinder 140a (which could be double or single action and which is supplied with pressurized hydraulic fluid through line 142) may be used move arm or yoke Y between the disengaged and engaged positions. As seen FIGS. 4 and 5, system 100 includes two actuators 140a, each connected to yoke Y. Actuators 140a are connected at one end thereof to yoke Y and at the other end thereof to shock/strut assembly 102.

An engagement portion, generally 145, which may include a rotatable braking device, or unit, generally 146, is connected to a distal end of an arm 144 of yoke Y and, upon system 100 being deployed, is constructed to engage a runway or landing surface upon yoke Y being in the engaged position and to also generally rotate into alignment with the direction of travel of the airplane A on such runway or landing surface.

Unit 146 is pivotally attached to the distal end of yoke arm 144 via a pivot 148 and includes a pivotal and/or rotary portion, which may take the form of a skid plate, generally 146a, which includes one or more downwardly extending engagement members, which may include a finger, tooth, barb or spike, generally 150, the tip, generally 152, of which includes a hardened point or tip of material, such as carbide or some other hard, durable material.

Actuators 140a are each connected to yoke Y via a pivot 154, which are each engaged in an upstanding tab 156 in yoke Y arm 144. This pivot arrangement allows actuators 140a to pivot thereabout during movement of yoke Y from a disengaged position, shown in FIG. 2, and the engaged position as shown in FIG. 3. The upper end of each actuator 140a, which includes a piston rod extending therefrom, is connected to shock/strut assembly 102 via a pivot 158.

A larger fender-shaped debris deflector 160, which could be connected to yoke arm 144 or, alternately, to another portion of the landing gear, protects and deflects debris from tire 104 when system 100 is deployed. Debris shields 162 may also be provided on yoke arm 144 to deflect debris which may be kicked up and propelled from system 100 when deployed.

As shown in FIG. 4, the primary braking system of airplane includes a brake assembly 166 at each wheel, which under normal conditions provides the braking action for airplane A. Brake assembly 166 is connected to a beam portion 168 of wheel truck beam 116. At the other end of wheel truck beam 116 is a beam portion 170 to which one or more wheels are connected, as shown in FIG. 1.

It should be noted here that yoke Y includes a first yoke arm portion 144A and second yoke arm portion 144B, and yoke Y is centered about shock/strut assembly 102, with the upper portion of each actuator 140a being connected to an actuator assembly 172 fixedly connected to shock/strut assembly 102.

Turning now to FIG. 6, braking unit 146, is shown in detail and includes a stationary, or static, component, or plate 176a, which is pivotally connected via pivot 148 to yoke arm portion 144. Beneath plate 176a is a rotatable component, or plate, 176c which rotates with respect to plate 176a during actual use of system 100. As noted above, unit 146, when deployed, rotates to be oriented generally in the direction of travel of airplane A, such as in the direction of the arrow A1 shown in FIG. 7, which is angularly displaced from the centerline CL of yoke arm 144.

Disposed between static plate 176a and rotatable plate 176c is a ball bearing arrangement, wherein ball bearings 176b are carried between bearing races 176d and 176e. This ball bearing arrangement allows for rotatable plate 176c to readily rotate as needed in emergency braking situations to optimize braking performance of engagement members 150 and hardened tips 152 in the direction of travel of airplane A, and thereby maximize the deceleration effectiveness of the drag induced against forward movement of airplane A by unit 146a. It should be noted that although a ball bearing arrangement has been shown to facilitate the relative rotation of rotatable plate 176c with respect to stationary, or static plate 176a, it is to be understood that other bearing arrangements (not shown) could be used if desired.

A member, generally 180, which may take the form of a sled-shaped plate having an upturned leading edge 182, facilitates the travel of member 180, and accordingly unit 146a to which it is attached, across the surface of the runway (or other landing surface) when system 100 is deployed. Additionally, member 180 provides an elongated longitudinal dimension to the combination of rotatable plate 176c and plate 180 to facilitate the alignment thereof with the general direction of travel of the airplane A during braking.

A control circuit, generally 190, (FIG. 2) is provided in system 100 and includes a sensor, generally 192, and a computer system, or processor, generally 194, such as a central processing unit (CPU), processor, axis-position modular (APM), etc., which is in turn connected to the hydraulic system (not shown), which provides hydraulic pressure to actuators 140. Sensor 192, which could be a strain gauge, proximity sensor, pressure transducer, or the like, has the capability of monitoring the downward force applied by yoke arm 144 when system 100 is deployed, and through connection with processor 194, can output such force in a manner (visually and/or audibly, etc.) in a manner that allows the pilot and/or air crew to monitor such force during emergency procedures. Such monitoring could be done via a display in the cockpit and/or through audible annunciators. Such downward force can be modulated manually via processor 194, i.e., selectively and/or automatically, if desired, with a predetermined downward force being selected for yoke arm 144, with such force being automatically maintained through feedback from sensor 192 and through interaction with sensor 192, processor 194, and actuators 140.

Referring specifically to controller 194 mentioned herein, other embodiments may provide a non-transitory computer readable medium and/or storage medium, and/or a non-transitory machine readable medium and/or storage medium, having stored thereon a machine code and/or a computer program having at least one code section executable by a machine and/or a computer, thereby causing the machine and/or computer to perform the steps as described herein with respect to dual function movement of yoke Y and/or braking unit 146.

Accordingly, aspects of the presently disclosed embodiments may be realized in hardware, software, or a combination of hardware and software. The present embodiments may be realized in a centralized fashion in at least one computer system or in a distributed fashion where different elements are spread across several interconnected computer systems.

Any kind of computer system 194 or other system adapted for carrying out the methods described herein may be suitable. For example, a typical combination of hardware and software may be a general-purpose computer system with a computer program that, when being loaded and executed, controls the computer system such that it carries out the methods described herein.

Aspects of the presently disclosed embodiments may also be embedded in a computer program product, which comprises all the features enabling the implementation of the methods described herein, and which when loaded in a computer system 194 is able to carry out these methods. "Computer program" in the present context means any expression, in any language, code or notation, of a set of instructions intended to cause a system having an information processing capability to perform a particular function either directly or after either or both of the following: a) conversion to another language, code or notation; b) reproduction in a different material form.

Turning now to FIGS. 8 and 9, another example embodiment of the present invention is illustrated. As shown in FIG. 8, such alternate example system, generally 200, includes an arm 206 having one or more downwardly extending claws, generally 208. In the embodiment shown in FIG. 9, three downwardly extending claws 208a, 208b, and 208c are provided. Preferably, each such claw includes a hardened tip 210 thereon for engaging the runway and/or landing surface. Arm 206, and accordingly, claw members 208a, 208b, and 208c are moved between a disengaged, and engaged, or deployed, position via hydraulic actuators 140, such as discussed above in regard to system 100.

While hydraulic actuators have been discussed herein, it is to be understood that other devices could be used, such as pneumatic cylinders, motorized screw mechanisms, magnetic systems, dead-weight systems, and/or electromagnetic systems, etc., instead of or in combination with the hydraulic actuators discussed herein.

In operation, an airplane emergency supplemental braking system 100 as disclosed herein may be activated in a landing scenario by the pilot flying or the first officer. Upon a sufficient portion of the airplane's weight being placed on the landing gear wheels 110, 112 and low friction surface conditions being detected (and a determination made that the loss of, or significant damage to, the airplane is probable due to over-running the end of the runway), it may become advisable to deploy system 100.

The activation controls (not shown) for system 100 could, for example, be placed on the airplane's flight deck, such as on the center aisle stand near the thrust levers, since they could be used in conjunction with thrust reversers, if the airplane is so-equipped. The controls could also be duplicated on the outboard console in situations when the pilot flying directs the first officer to manage the deployment of the system.

As system 100 is activated, a portion of the airplane's weight is transferred from the tires 104, 106 of the main landing gear to the hardened tips or teeth 152 of the engagement members 150 of system 100, thereby causing a relatively large concentrated friction against the landing surface, or runway substrate, and in some cases, physically damaging and sacrificing the substrate if maximum force is applied against yoke arm 144 by the pilot. During this process, runway portions and debris may be lifted and propelled in a number of directions. When system 100 has been deployed, engagement members 150, start to penetrate into the runway or other landing surface and could potentially fracture such surface.

By virtue of the drag created by activation of the system 100, the required runway length should therefore be reduced, and in some cases a dramatic reduction may be possible. It is also possible that system 100 could prevent loss of the aircraft in cases of severe cross-wind conditions combined with low friction runway surface conditions. Under this potentially "side skid" condition, the system 100 could potentially prevent the airplane from unintentionally leaving the side of the runway.

System 100 facilitates rapid airplane deceleration as braking unit 146a is forced itself into a slippery runway surface after landing, and its activation is particularly suited when the airplane's primary or conventional brake system cannot provide enough traction to stop the airplane from running off the runway or from crashing against other objects.

The present invention thus finds application in those cases when it is better to damage a fraction of the runway pavement rather than lose or significantly damage the entire airplane and risk injury to those onboard the airplane and/or bystanders.

It is conceivable that the present invention or a modified embodiment of it could be used in situations other than emergencies. In primitive runway situations, or limited risk operations, it may be possible to use the system 100 without damage to the airplane, main landing gear, tires, etc. Such flights may be encountered in icy landing situations, for example, in scientific field operations in which civilians are supported by the military flying C-130 airplanes into McMurdo Station in Antarctica.

Many modifications and other embodiments of the disclosure set forth herein will come to mind to one skilled in the art to which these disclosure pertain having the benefit of the teachings presented in the foregoing descriptions and the associated drawings. Therefore, it is to be understood that the disclosure are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. An aerospace vehicle braking system for decelerating an aerospace vehicle on a landing surface, the aerospace vehicle braking system comprising:
   landing gear connected to said aerospace vehicle;
   an arm having a first portion connected to the aerospace vehicle and a second portion generally distal to said first portion;
   at least one debris deflector component connected to said arm that generally deflects away from said landing gear debris which may arise upon said engagement portion engaging the landing surface with a force sufficient to significantly decelerate the aerospace vehicle;
   said second portion of said arm including an engagement portion configured to engage the landing surface; and
   said arm being movable between a first position wherein said engagement portion is substantially disengaged from the landing surface and a second position wherein said engagement portion engages the landing surface with a force sufficient to significantly decelerate the aerospace vehicle.

2. The aerospace vehicle braking system of claim 1, wherein said arm is connected to said landing gear for movement with respect thereto between said first position and said second position.

3. The aerospace vehicle braking system of claim 1, wherein said arm is pivotally connected to said aerospace vehicle for pivoting between said first position and said second position.

4. The aerospace vehicle braking system of claim 1, wherein said arm is pivotally connected to said landing gear for pivoting with respect thereto between said first position and said second position.

5. The aerospace vehicle braking system of claim 1, wherein said engagement portion is configured to physically damage the landing surface upon said arm being in said second position.

6. The aerospace vehicle braking system of claim 1, further comprising:
a first component connected to said second portion of said arm and configured to pivot about a first axis with respect to said arm;
a second component connected to said first component and configured to pivot with respect to said first component about a second axis generally perpendicular to said first axis in response to the direction of travel of the aerospace vehicle upon the landing surface; and
at least one engagement member extending downwardly from said second component that engages the landing surface upon said arm being in said position.

7. The aerospace vehicle braking system of claim 1, further comprising:
a braking device connected to said second portion of said arm and configured to pivot with respect to said arm in response to the direction of travel of the aerospace vehicle upon the landing surface; and
at least one engagement member extending downwardly from said second component that engages the landing surface upon said arm being in said position.

8. The aerospace vehicle braking system of claim 1, further comprising:
a braking device connected to said second portion of said arm and configured to pivot with respect to said arm in response to the direction of travel of the aerospace vehicle upon the landing surface.

9. The aerospace vehicle braking system of claim 1, further comprising:
a braking device connected to said second portion of said arm and configured to pivot with respect to said arm in response to the direction of travel of the aerospace vehicle upon the landing surface; and
said braking device having an upturned leading surface with respect to the direction of travel of the aerospace vehicle upon the landing surface.

10. The aerospace vehicle braking system of claim 1, further comprising:
tires connected to said landing gear.

11. The aerospace vehicle braking system of claim 1, further comprising:
said engagement portion of said arm including at least one downwardly extending claw-shaped portion that engages the landing surface upon said arm being in said second position.

12. The aerospace vehicle braking system of claim 1, further comprising:
said engagement portion of said arm including at least three spaced-apart downwardly extending claw-shaped portions that each engage the landing surface upon said arm being in said position.

13. The aerospace vehicle braking system of claim 1, further comprising:
at one sensor that monitors the force exerted by said engagement portion against the landing surface.

14. The aerospace vehicle braking system of claim 1, further comprising:
an actuator connected to said arm to selectively move said arm between said first position and said second position.

15. The aerospace vehicle braking system of claim 1, further comprising:
at least one sensor that monitors the force exerted by said engagement portion against the landing surface;
an actuator connected to said arm to selectively move said arm between said first position and said second position; and
at least one controller connected to said sensor and to said actuator that allows for the force exerted by said engagement portion against the landing surface to be selectively controlled.

16. The aerospace vehicle braking system of claim 1, further comprising:
at least one sensor that monitors the force exerted by said engagement portion against the landing surface;
an actuator connected to said arm to selectively move said arm between said first position and said second position; and
at least one controller connected to said sensor and to said actuator that automatically applies in a predetermined manner the force to be exerted by said engagement portion against the landing surface.

17. A landing gear system for an aerospace vehicle, the landing gear comprising:
a force bearing portion connected to the aerospace vehicle that at least partially supports the aerospace vehicle;
an arm having a first portion connected to said force bearing portion and a second portion generally distal to said first portion;
an actuator connected to said arm to selectively move said arm between said first position and said second position; and
at least one debris deflector device that generally deflects away from said landing gear debris which may arise upon said engagement portion engaging the landing surface with a force sufficient to significantly decelerate the aerospace vehicle;
said second portion of said arm including an engagement portion configured to forcefully engage the landing surface; and
said arm being movable between a first position wherein said engagement portion is substantially disengaged from the landing surface and a second position wherein said engagement portion engages the landing surface with a force sufficient to significantly decelerate the aerospace vehicle.

18. The landing gear system of claim 17, further comprising:
a first component connected to said second portion of said arm and configured to pivot about a first axis with respect to said arm;
a second component connected to said first component and configured to pivot with respect to said first component about a second axis generally perpendicular to said first axis in response to the direction of travel of the aerospace vehicle upon the landing surface; and at least one engagement member extending downwardly from said second component that engages the landing surface upon said arm being in said position.

19. The landing gear system of claim 18, further comprising:

a braking device connected to said second portion of said arm and configured to pivot with respect to said arm in response to the direction of travel of the aerospace vehicle upon the landing surface; and at least one engagement member extending downwardly from said second component that engages the landing surface upon said arm being in said position.

20. The landing gear system of claim 17, further comprising:

a braking device connected to said second portion of said arm and configured to pivot with respect to said arm in response to the direction of travel of the aerospace vehicle upon the landing surface.

21. An aerospace vehicle that lands on a landing surface, the aerospace vehicle comprising:

a fuselage;

an airfoil connected to said fuselage;

at least one power source connected to at least one of said fuselage and said airfoil;

a landing gear configuration connected to the fuselage that provides support of the aerospace vehicle on the landing surface;

an arm having a first portion connected to the landing gear and a second portion generally distal to said first portion;

at least one debris deflector component connected to said arm that generally deflects away from said landing gear debris which may arise upon said engagement portion engaging the landing surface with a force sufficient to significantly decelerate the aerospace vehicle;

said second portion of said arm including an engagement portion configured to forcefully engage the landing surface;

said arm being movable between a first position wherein said engagement portion is substantially disengaged from the landing surface and a second position wherein said engagement portion engages the landing surface with a force sufficient to significantly decelerate the aerospace vehicle; and an actuator connected to said arm to selectively move said arm between said first position and said second position.

22. A method of decelerating an aerospace vehicle on a landing surface, the method comprising:

possessing landing gear connected to said aerospace vehicle, an arm connected to said aerospace vehicle, and at least one debris deflector component connected to said arm, the arm having a first portion connected to the aerospace vehicle and a second portion generally distal to said first portion, said second portion of said arm including an engagement portion configured to engage the landing surface;

moving said arm between a first position wherein said engagement portion is substantially disengaged from the landing surface to a second position wherein said engagement portion engages the landing surface;

applying a force against the landing surface with said engagement portion sufficient to significantly decelerate the aerospace vehicle; and deflecting away from said landing gear debris which may arise upon said engagement portion engaging the landing surface with a force sufficient to significantly decelerate the aerospace vehicle, wherein said deflecting of said debris is accomplished using said debris deflector.

23. The method of claim 22, wherein said applying said of force against the landing surface with said engagement portion sufficient to significantly decelerate the aerospace vehicle is accomplished using a powered actuator.

24. The method of claim 22, wherein said applying of said force against the landing surface with said engagement portion sufficient to significantly decelerate the aerospace vehicle further comprises monitoring the force exerted by said engagement portion against the landing surface using at least one monitor.

25. The method of claim 22, wherein said applying of said force against the landing surface with said engagement portion sufficient to significantly decelerate the aerospace vehicle further comprises:

monitoring the force exerted by said engagement portion against the landing surface using at least one monitor; and using said monitor to selectively control the force exerted by said engagement portion against the landing surface.

26. The method of claim 22, wherein said applying of said force against the landing surface with said engagement portion sufficient to significantly decelerate the aerospace vehicle further comprises:

monitoring the force exerted by said engagement portion against the landing surface using at least one monitor and at least one controller; and using said monitor and said controller to automatically apply in a predetermined manner the force exerted by said engagement portion against the landing surface.

27. An aerospace vehicle braking system for decelerating an aerospace vehicle on a landing surface, the aerospace vehicle braking system comprising:

a force bearing portion connected to the aerospace vehicle that at least partially supports the aerospace vehicle;

an arm having a first portion connected to the aerospace vehicle and a second portion generally distal to said first portion;

at least one debris deflector component connected to said arm that generally deflects away from said force bearing portion debris which may arise upon said engagement portion engaging the landing surface with a force sufficient to significantly decelerate the aerospace vehicle;

said second portion of said arm including an engagement portion configured to engage the landing surface; and said arm being movable between a first position wherein said engagement portion is substantially disengaged from the landing surface and a second position wherein said engagement portion engages the landing surface with a force sufficient to significantly decelerate the aerospace vehicle.

* * * * *